United States Patent [19]

Tyree, Jr. et al.

[11] 4,356,707
[45] Nov. 2, 1982

[54] CRYOGENIC CABINET FREEZER

[75] Inventors: Lewis Tyree, Jr., 145 Briarwood Ave., North, Oak Brook, Ill. 60521; James R. Missig, Joliet; George D. Rhoades, La Grange, all of Ill.

[73] Assignee: Liquid Carbonic Corporation, Chicago, Ill. ; by said James R. Missig and George D. Rhoades

[21] Appl. No.: 229,923

[22] Filed: Jan. 30, 1981

Related U.S. Application Data

[63] Continuation-in-part of Ser. No. 144,594, Apr. 28, 1980.

[51] Int. Cl.³ .................................................. F25D 25/02
[52] U.S. Cl. .......................................... 62/381; 62/384
[58] Field of Search ........................ 62/381, 384, 309

[56] References Cited

U.S. PATENT DOCUMENTS

| | | | |
|---|---|---|---|
| 2,780,923 | 2/1957 | Jones | 62/2 |
| 3,063,258 | 11/1962 | Szachnitowski | 62/309 |
| 3,385,073 | 5/1968 | Snelling | 62/45 |
| 3,447,336 | 6/1969 | Gramse | 62/239 |
| 3,708,995 | 1/1973 | Berg | 62/380 |
| 3,792,595 | 2/1974 | Willis | 62/414 |

OTHER PUBLICATIONS

"Rapid Freeze", Victory Manufacturing—1976.

Primary Examiner—Ronald C. Capossela
Attorney, Agent, or Firm—Fitch, Even, Tabin, Flannery & Welsh

[57] ABSTRACT

A cabinet cooler or freezer which efficiently utilizes cryogenic refrigeration either with or without mechanical refrigeration. The freezer intermittently freezes relatively large batches of food by efficiently utilizing the natural expansion effect of a liquid cryogen, in combination with mechanical circulation by blowers, to create an overall circulation that efficiently removes heat from the food. A secondary circulation effect is induced, in a manner similar to the operation of a jet pump, which amplifies the circulation and allows $CO_2$ to be employed as the cryogen with modulating valve control to achieve uniformly low temperature throughout the cabinet without snow build-up on the cabinet bottom. Some cabinet versions create a cyclonic circulation pattern about a vertical axis that is particularly effective.

21 Claims, 12 Drawing Figures

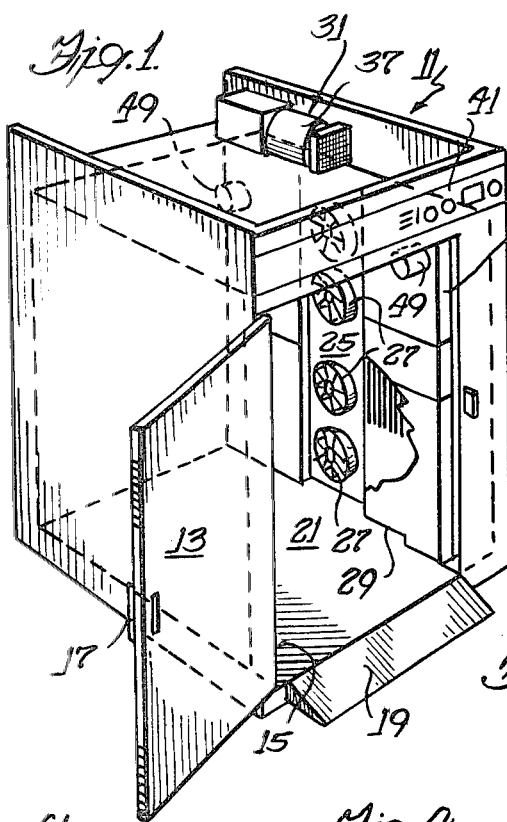
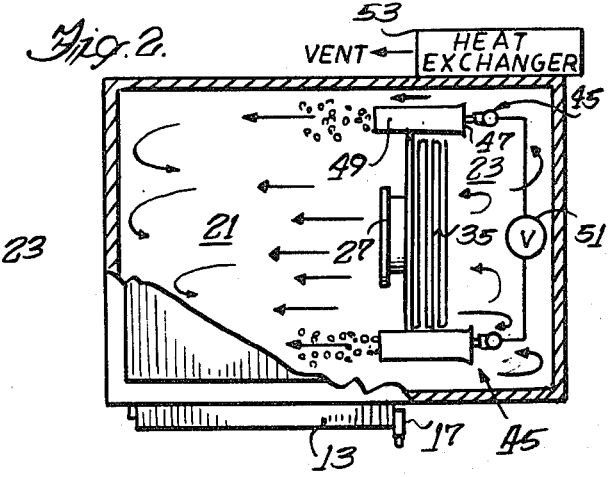
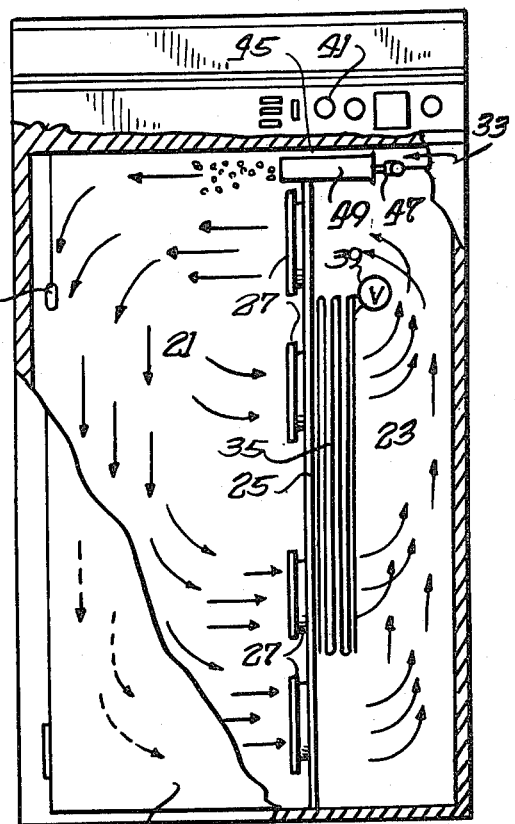
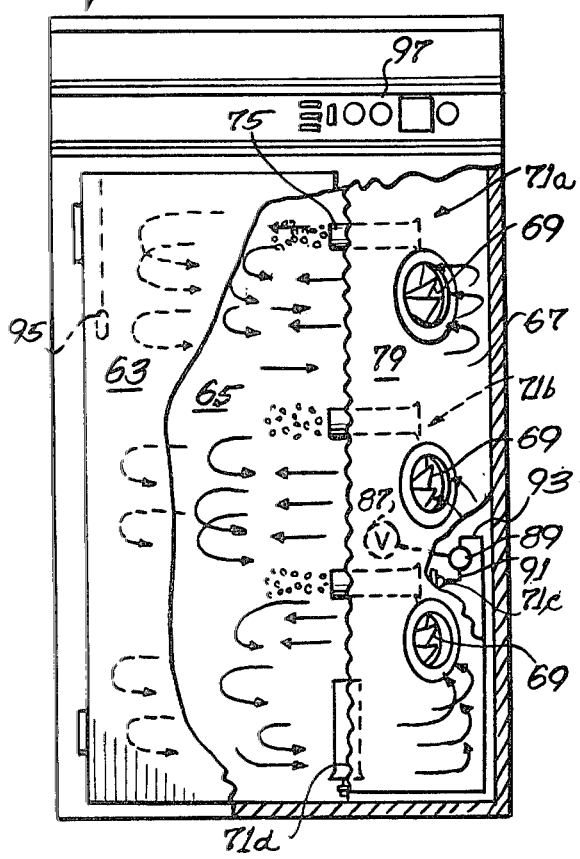
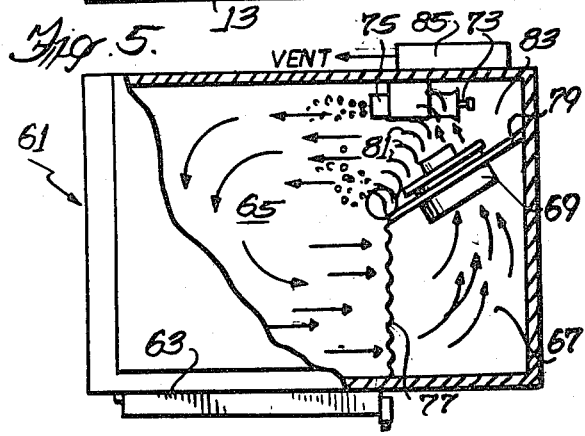

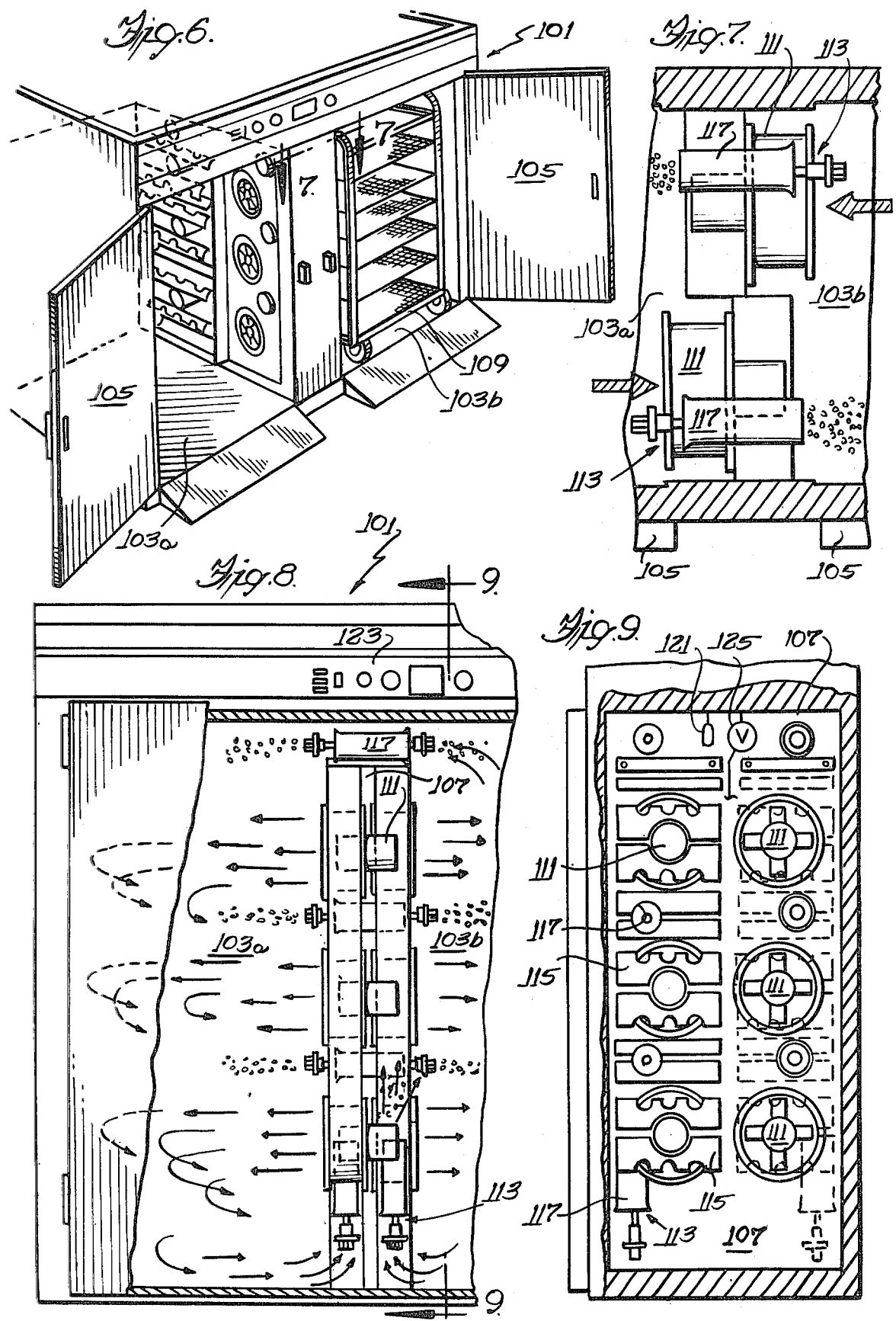

CRYOGENIC CABINET FREEZER

This application is a continuation-in-part of our earlier application Ser. No. 144,594, filed Apr. 28, 1980.

This invention relates to cryogenic cooling apparatus and more particularly to apparatus for using a cryogen to cool a load within a specifically defined chamber or compartment.

BACKGROUND OF THE INVENTION

Over the years, the advantages of cryogenic cooling in being able to produce lower temperatures than conventionally available mechanical freezing apparatus has become apparent and has been found to be efficient for commercial applications. Cryogenic fast-freezers have proved to be of significant benefit to users desiring relatively low-temperature environments, for example, in the region of −30° F., and examples of such cryogenic freezing units are set forth in U.S. Pat. Nos. 3,660,985, 3,672,181, 3,754,407 and 3,815,377. Various of the apparatus illustrated in these patents were particularly designed for use with carbon dioxide, which offers particular advantages when cooling or freezing using temperatures in the aforementioned range.

U.S. Pat. No. 4,127,008, issued Nov. 28, 1978 to Lewis Tyree, Jr., shows a variety of cryogenic cooling apparatus including some which are designed to employ a closed chamber in which a static or stationary load can be placed, for example by rolling in a wheeled cart or rack carrying the product disposed on vertically spaced shelves. The cooling is accomplished in the illustrated devices solely by the use of cryogen which was expanded in a heat-exchanger and recovered, requiring slightly more sophisticated equipment. It is felt that there is a commercial market for somewhat simpler devices which so efficiently utilize cryogen to cool or freeze a load within a compartment that expenditure of the cryogen can be permitted while remaining cost effective.

SUMMARY OF THE INVENTION

The invention provides a cabinet cooler or freezer which efficiently utilizes cryogenic refrigeration, with or without mechanical refrigeration, to rapidly and efficiently lower the temperature of a product load. As such, in one aspect, the invention provides apparatus which is capable of intermittently handling relatively large batches of product on an efficient and economically attractive basis. In another aspect, a spiral or helical conveyor is employed to obtain the advantages of the invention in a dynamic load environment. The invention utilizes the natural expansion effect of cooling with a liquid cryogen that is being vaporized, in combination with the mechanical circulation of the gaseous atmosphere by blowers or fans, to achieve an efficient circulation pattern that establishes surface heat-exchange with the product being cooled and the cold environment. A secondary circulation effect is induced, in a manner similar to the operation of a jet pump, which amplifies the circulation and contributes to overall efficiency.

BRIEF DESCRIPTION OF THE DRAWINGS

FIG. 1 is a perspective view, with portions broken away, of a single-door freezing apparatus utilizing both cryogenic and mechanical refrigeration and embodying various features of the invention;

FIG. 2 is a top view with a major portion broken away to show the interior of the apparatus of FIG. 1;

FIG. 3 is a front view with portions broken away and with arrows provided to diagrammatically show the atmospheric flow patern achieved within the apparatus of FIG. 1;

FIG. 4 is a view similar to FIG. 3 of an alternative version of a freezer cabinet using all cryogenic refrigeration and embodying various features of the invention;

FIG. 5 is a top view and a large portion broken away to show the interior of the cabinet of FIG. 4;

FIG. 6 is a perspective view, similar to FIG. 1, of a two-door all-cryogenic freezing cabinet embodying various features of the invention;

FIG. 7 is a top sectional view taken generally along the line 7—7 of FIG. 6;

FIG. 8 is a front view, with portions broken away, of the apparatus shown in FIG. 6;

FIG. 9 is a side sectional view taken generally along the line 9—9 of FIG. 8;

DETAILED DESCRIPTION OF THE PREFERRED EMBODIMENTS

Figure 10:
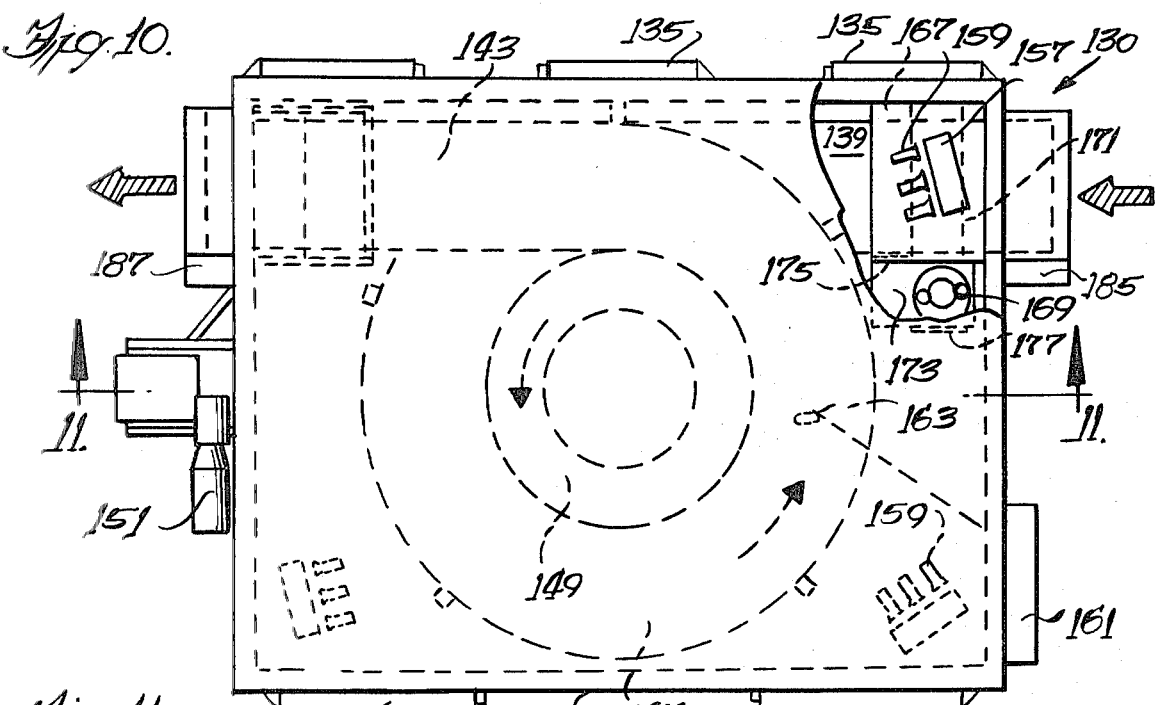
FIG. 10 is a plan view of an alternative version of a cabinet freezer which incorporates a helical or spiral conveyor.

Illustrated in FIGS. 1-3 is a cabinet-type refrigeration device which includes a cabinet 11 formed with insulated walls for maintaining a low-temperature environment therewithin. A hinged door 13 is provided to close an opening 15 through the front wall of the cabinet, which door can be locked in closed position by a latch 17. A short ramp 19 is preferably provided to allow a wheeled cart to be easily moved into and out of the cooling enclosure or region 21 defined by the cabinet 11 and closed by the door 13.

A refrigeration-generation region 23 is provided within the cabinet and is generally defined by a partition 25 which extends for a major portion of the height of the cabinet but which terminates slightly below the upper edge. The rear wall of the cabinet and the interior surface of the closed door 13 are parallel and extend from the boundary with the region 23, generally defining the cooling enclosure. Four circular openings are provided in the partition 25, and four fans or blowers 27, driven by electric motors, are mounted in the openings in the partition. A rectangular opening 29 is also provided at the bottom of the partition 25.

Because the cabinet 11 is provided with refrigeration equipment designed for the creation of temperatures well below the freezing point of water, it is generally referred to as a freezer. However, it should be understood that this is simply dependent upon the time that the load is allowed to remain in the cabinet and/or the temperature at which the refrigeration equipment is set to maintain the enclosure 21, and accordingly it could be used and referred to as a cooler. The refrigeration-generation region 23 is provided with a mechanical refrigeration system 31 and a cryogenic refrigeration system 33 which can be both operated at the same time or either can be operated to the exclusion of the other. The fans 27 operate to circulate the vapor in the same manner whether or not the cryogenic system is operating. The cryogenic system 33 will usually be operated only in conjunction with the operation of the mechanical refrigeration system 31.

By "mechanical refrigeration system" is meant one which applies thermodynamics in a manner wherein a cooling medium, or refrigerant, goes through a cycle so that it is recovered and reused. Generally, a vapor-compression cycle is employed wherein the liquid refrigerant is evaporated in low pressure region, i.e. an evaporator, at a low pressure in an evaporator to produce cooling, subsequently withdrawn to a compressor where the pressure (and temperature) of the gaseous refrigerant is raised, then transferred to a condenser wherein its heat is discharged to the environment and the refrigerant liquifies, and is thereafter stored in a receiver until such time that it is to be recycled through an expansion valve back into the evaporator. By a "cryogenic refrigeration system" is meant one wherein a liquified gas, usually carbon dioxide or nitrogen, is allowed to expand and evaporate, often producing a temperature of about $-110°$ F., or below. Usually, the cryogen is expended, e.g. by discharge to the atmosphere after the desired use has been made of its capacity to absorb heat in carrying out an attendant cooling or freezing operation.

The mechanical refrigeration system 31 in the illustrated embodiment includes an evaporator 35 wherein a refrigerant, such as a Freon, is allowed to evaporate to a vapor or gas. The evaporator 35 is supplied from a receiver which is part of a compressor-condenser combination 37 located atop the cabinet 11. A control valve 39 allows the flow of Freon liquid from the higher pressure receiver into the evaporator 35. The cabinet 11 is provided with an overall control system 41 which allows it to be set in different modes of operation and which receives a signal from a sensor 43 that gives an indication of the temperature at an upper location within the refrigeration region 21. The valve 39 when signalled by the control system allows the liquid Freon to flow from the higher pressure region in the receiver to the lower pressure region in the evaporator 35.

The control system 41 causes the four blowers 27 to run whenever the door 13 is latched shut and the freezer is actuated in any mode of operation, creating a primary circulation of the cabinet atmosphere. The lowermost three fans 27 are operated to suck the gaseous atmosphere from the lower regions of the refrigeration region 21 and direct the atmosphere to the right as depicted in FIG. 3. The uppermost blower 27 is operated to take suction from its right-hand side and discharge to the left-hand side as indicated in FIG. 3. This creates an upward flow along the right-hand wall in the refrigeration-generation region 23, and if desired, baffles can be provided to assist this flow pattern.

Disposed at a level above the uppermost blower are a pair of cryogen injection devices 45 in the form of injection nozzles 47 connected to a source of high pressure cryogen. Although nitrogen or some other suitable cryogen may be employed, liquid carbon dioxide is preferred, and the nozzles 47 are preferably spring-loaded expansion nozzles designed to efficiently product a stream of $CO_2$ snow and $CO_2$ vapor, similar to those disclosed in U.S. Pat. No. 3,815,377, issued June 11, 1974, the disclosure of which is incorporated herein by reference.

Each of the nozzles 47 discharges at a location within a surrounding inducer 49 which preferably has a flared entrance and amplifies the circulation, thereby increasing efficiency. The expansion of the liquid $CO_2$ through an orifice at the end of the nozzle 47 into the inducer and the discharge of this stream out the open left-hand end creates a significant secondary circulation of gas within the interior of the cabinet. The action is similar to that of a jet pump and causes a substantial volume of gas to be sucked into the right-hand entrance of the inducer 49, which is discharged at a high velocity along with the vapor and snow being created at the nozzle orifice. Not only does the effect of the pair of inducers 49, plus the uppermost fan 27, balance the three lower fans operating in the opposite direction to create a good flow pattern throughout the entire refrigeration zone 21, but the dispersion of the subliming $CO_2$ snow within the gaseous circulation pattern suspends the snow particles and distributes them excellently throughout the zone so that, even after operation for an extended period of time, no accumulation of snow is created at the bottom of the left-hand refrigeration zone 21.

The injection devices 45 are connected in parallel downstream of a modulating valve 51 which changes the pressure of the liquid cryogen flowing to the injection devices 45 in response to a signal received from the control system 41. To prevent pressure from building-up within the cabinet, cryogen vapor is vented from the cabinet whenever the cryogen system is operating. When the cryogen is $CO_2$, the cold vapor is discharged through a heat-exchanger, which may be mounted on the rear wall of the cabinet 11 and which may exhaust through a check valve to a vent conduit that preferably discharges to the atmosphere exterior of the plant wherein the cabinet freezer is being operated. The incoming stream of liquid $CO_2$ from a suitable source, usually a standard high-pressure liquid $CO_2$ storage tank, passes through the heat-exchanger 52 where the high-pressure liquid is cooled by heat-exchange with the cold exiting vapor.

The modulating valve 51 which varies the rate at which liquid cryogen is injected in combination with the secondary circulation created by the inducers 49 results in an extremely effective use of cryogen and is particularly advantageous in its overall energy efficiency when its is employed simultaneously with the mechanical refrigeration system 31 that can effectively provide cooling in upper temperature range. For example, the cryogen refrigeration system 33 may be operated during the time wherein product load is accepting more refrigeration than the mechanical system 31 can supply—which is usually during the early part of a refrigeration cycle, e.g. when certain food products are being initially crusted in order to seal in flavor and create a superior texture.

As an example of the operation of the freezer cabinet 11, a wheeled cart containing an open rack or framework upon which are supported a plurality of layers of shallow trays containing food products, such as especially baked goods or specialty entrees, is pushed into place through the opening 15. After the door 13 has been closed and latched, the control system 41 is set to the desired mode of operation, for example, rapid-freezing, and actuated to begin the cycle. The four blowers 27 are immediately started, and the valve 39 automatically supplies liquid Freon to the evaporator through which the blowers are blowing the atmosphere within the cabinet.

Because the temperature being sensed initially is quite high, likely close to ambient, the control system 41 generally operates the cryogen injection devices 45 at a high rate. Assuming that liquid $CO_2$ is being expanded, the modulating valve 51 opens relatively wide and may apply nearly full pressure of liquid cryogen to the snow-making nozzles 47. This results in an immediate discharge of $CO_2$ snow and vapor from the left-hand end of the two inducers 49 which creates the desired secondary circulation by sucking gaseous atmosphere through the flared entrances. As a result, the flow of cold vapor and finely dispersed particles of snow is outward across the upper layers of the load on the cart being refrigerated and then downward along the left-hand wall of the refrigeration zone 21 whence it is drawn across the lower layers of product, from left to right, by the flow patterns set up by the lowermost three blowers 27.

As the temperature within the refrigeration zone 21 begins to drop to near the preselected temperature and is detected by the sensor 43, the main control system 41 causes the modulating valve 51 to begin to close slightly, thus lowering the pressure of the liquid $CO_2$ and reducing the rate of $CO_2$ flowing to the cryogen injection devices 45 and the rate at which $CO_2$ snow and vapor are injected via the nozzles. When a certain predetermined temperature is reached within the cabinet, for example, $-80°$ F., the control system 41 may close the modulating valve 51 entirely, thus discontinuing operation of the cryogen refrigeration system 33 until such time as the temperature might again rise above this predetermined temperature. Of course, different predetermined temperatures may be set for different food products and when different cryogens are used.

The cryogen refrigeration system 33 may be set to operate for a total "freeze time" duration. Thereafter, the mechanical refrigeration system 31 continues to operate and may operate intermittently when the cabinet temperature begins to stabilize. The mechanical refrigeration system 31 maintains the atmosphere within the refrigeration zone a desired holding temperature range, typically, about $-10°$ F. to $0°$ F. Once an overall set time expires, the control system 41 may be programmed to light an indicator light and/or cause an audible signal to be sounded to alert personnel in the plant that the cycle has been completed.

Shown in FIG. 4 is a cabinet freezer 61 which is similar in outward appearance to the cabinet freezer 11 but which is provided with an all-cryogenic refrigeration-generation system. The cabinet includes a single door 63 which provides access to a refrigeration zone 65 which is substantially the same as that previously described. A refrigeration-generation zone 67 on the right-hand side of the refrigeration zone 65 in FIG. 5 is of substantially the same size as the zone 23; however, the refrigeration-generation equipment is different. In the illustrated embodiment, three blowers 69 are employed in combination with four cryogen injection units 71a, b, c, & d, each of which includes the combination of an injection nozzle 73 and an inducer 75 of the same type as hereinbefore described with regard to the FIG. 1 embodiment. Instead of employing a baffle to separate the two zones, porous screen material 77 is employed which extends vertically from top to bottom and which merely provides protection against the possibility of inadvertent contact with the blades of the blowers while allowing free-flow of gaseous atmosphere back and forth between the two zones.

The three blowers 69 are mounted in a main baffle 79 which extends from the right-hand wall generally diagonally across the region to a point generally adjacent the screen 77. The blowers 69 are mounted in three apertures in the baffle main 79 and are of a design wherein the gaseous stream discharged by the blower passes over the motor housing, as best seen in FIG. 5. Disposed in generally converging relationship to the main baffle is a row of curved vanes or thin baffles 81 which extend substantially from the floor of the cabinet to the ceiling. The vanes 81 are uniformly spaced apart and serve to smoothly turn the vapor discharge from the blowers into a flow pattern across the refrigeration zone 65 from right to left, as shown by the pattern of arrows in FIG. 5. The vanes 81 serve a dual purpose, as described hereinafter in more detail, of creating a relatively high-pressure region 83 between the main baffle 79 and the row of vanes.

Three of the cryogenic injection devices 71a, b & c and their associated inducers 75 are mounted horizontally at a vertical level just slightly higher than the three blowers 69, as shown in FIG. 4. The fourth cryogen injection device 71d is mounted vertically near the bottom of the cabinet. With respect to the three horizontal devices, the inducers 75 are mounted in passageways cut out from the vanes 81 so that their entrances lie on the right-hand side of the row of vanes, in the high-pressure region 83, and each exit is on the left-hand side of the vanes. As a result of this design and location, the high-pressure gas region at the entrance of the inducers 75 has the effect of supercharging the inducers and creating an even more effective secondary circulation of vapor throughout the refrigeration zone 65.

The fourth vertically oriented inducer 71d is located generally adjacent the the vertex of the region defined by baffle 79 and the row of vanes 81, as seen in FIG. 5, and is directed upward. The two vanes 81 nearest the door are shortened to allow the inducer unit to be accomodated. In the all-cryogenic cabinet freezer 61, the cryogen is employed to provide refrigeration throughout the entire temperature range wherein cooling or freezing is being accomplished. For efficient performance when only a low rate of refrigeration need be supplied, the modulating function referred to hereinbefore is important, and the vertical disposition of the fourth injection unit and its location near the bottom are also important, particularly when the cryogen is carbon dioxide. As can be seen from FIG. 4, the flow pattern purposely established in the refrigeration zone 65 is generally stratified, as typified by the pattern of arrows. This arrangement assures the desired flow through relatively narrow horizontal passageways between layers of trays on a wheeled cart or rack. The vertically disposed injection unit 71d not only assures effective mixing of vapor between these stratified layers when its discharge intersects with the discharges from the three blowers 69, but it also assures that a significantly colder region is not created near the bottom of the refrigeration zone 65 wherein snow might possibly accumulate.

Although the supply of liquid cryogen to the injection units 71 can be in the same manner as hereinbefore described with respect to the freezer 11, preferably a piping arrangement is employed which directs a stream of cryogen of relatively higher vapor content to the vertical injection unit as compared to the streams which are supplied to three horizontal injection units. In this respect, a heat-exchanger 85 is located at the vapor vent outlet, and a modulating valve 87 is located in the supply line for the incoming $CO_2$ stream which is the same as previously described. However, the cryogen from the valve 87 flows to a horizontal manifold 89 in the refrigeration-generation zone 67 from which the four inducer units are supplied. The liquid in the top region of the manifold will tend to have a greater vapor content than the liquid in the lower region.

The three horizontal injection units 71a, b & b are supplied by piping 91 which connects to the bottom of the manifold 89, and the vertical injection unit 71d is supplied through piping 93 which connects to the top of the manifold. Accordingly, the liquid cryogen flowing in the manifold having the higher vapor content is preferentially directed to the lower injector 71d. This has the advantage of creating a somewhat lesser percentage of $CO_2$ snow at the lower injector and a greater percentage of vapor, thus achieving an even greater upward secondary circulation to accomplish the desired mixing. Likewise, the relatively greater percentage of snow exiting from the three horizontal injection units places the snow in the vicinity of the product being cooled and/or frozen where it is most effective. The secondary circulation created by the inducers 75, together with the blowers 69, creates a cyclonic effect about a vertical axis which very efficiently cools material even when disposed in layers of closely spaced shallow trays.

The overall function of the freezer cabinet 61 is generally the same as that earlier described except that, of course, all of the refrigeration results from the initial injection of cryogen. The three blowers 69 are set to run continuously, with the injection units 71 being operated in response to the temperature sensed by a sensor 95 and the particular program which has been set into the main control system 97.

Although the cabinet 61 illustrated and described is designed to accept and freeze a stationary batch of food product disposed in shallow trays and supported upon a transportable cart having multiple shelves, the cooling principles embodied in the apparatus design can be used effectively to cool throughout a defined chamber on compartment. For example, a spiral endless conveyor may be located within a relatively large cabinet having a lower entrance and an upper exit upon which food products can be continuously transported while they are being cooled and frozen by the cyclonic circulation effect that is created about a central axis, that may substantially concide with the axis of the spiral conveyor.

Depicted in FIGS. 6 through 9 is a freezer 101 which resembles the freezer 61 insofar as it contains an all cryogenic refrigeration system; however, it is designed to have substantially twice the capacity by being provided with two separate refrigeration zones 103a and b to which access is provided by separate doors 105. A refrigeration generation zone 107 is located centrally between the two refrigeration zones. Although the freezer 101 can be operated with a load in only one of the two zones 103, by eliminating the operation of certain of the cryogen injection units directed toward the zone not being used, it is far more economical and efficient to load both of the zones simultaneously and carry out concurrent cooling and/or freezing operations in both zones at the same time. A representative wheeled cart 109 is shown in the right hand compartment in FIG. 6 which has a plurality of horizontal racks or shelves that may be spaced closer together depending upon the particular product being frozen.

The equipment in the refrigeration generation zone 107 includes six blowers 111 of the type described with respect to the freezer 61, which discharge the vapor stream over their electric motor housings, being aligned in two side-by-side vertical rows. As best seen in FIG. 7, the three blowers 111 in the front row nearest the doors 105 take suction from the left-hand zone 103a and discharge into the right-hand refrigeration zone 103b, whereas the three blowers 111 in the rear row operate vice-versa. Accordingly, as generally depicted by the arrow pattern in FIG. 8, the blowers tend to create a relatively stratified, cyclonic circulation throughout both refrigeration zones. This circulation is extremely effective in achieving contact between the cold vapor and the layers of food product being cooled which are supported on the many-tiered wheeled carts 109, and it greatly adds to the overall efficiency of the freezer.

The actual refrigeration is achieved by cryogen injection units 113 which are substantially the same as those described with respect to the freezer 61, but twice in number. In this respect, a horizontal injection unit 113 is associated with and positioned just slightly above each of the blowers 111 (as best seen in FIG. 9) which unit discharges in the same direction as the blower, and these six injection units thus reinforce the cyclonic movement of the gaseous atmosphere within the cabinet which achieves the extremely efficient cooling and/or freezing of the product disposed in relatively shallow layers. Flow diffusing baffles 115 are preferably located in the regions of discharge to spread the discharge stream from each of the blowers 111 so that intermingling and mixing occurs between it and the adjacent secondary circulation streams emanating from the inducers 117 of the injection units 113.

In addition, a single vertically oriented injection unit 113 is located in association with each vertical row of blowers. As in the case of the freezer 61, each of the two vertically oriented injection devices 113 is directed to discharge into a region where it will intersect with the discharge streams from the three blowers 111 disposed thereabove it. This arrangement eliminates the possibility of stratification occurring on one vertical level which might create a different temperature there than at other levels and also assures that a particularly cold region is not created near the bottom of the zone as a result of the tendency of cold, more dense vapor to gravitate downward.

A temperature sensor 121 may be located in the rear of the refrigeration-generation region 107 that is connected to a main control unit 123. Alternatively, a pair of sensors may be located one in each of the refrigeration regions with the control system being designed to simply average the temperatures which it interprets from the signals received. A single modulating valve 125 can be employed to control the rate at which cryogen is simultaneously injected from all of the units 113. Alternatively, one modulating valve can be used to control the front four injector units and another to control the rear four units, in which case four of the units can be removed from operation in the case when only a single load is being frozen in one refrigeration zone 103—by simply having the control system 123 shut down one modulating valve.

Preferably, a horizontal manifold (not shown) is also used so that the two vertically oriented injection units 113 are supplied by connections coming from the upper region of the manifold and the six horizontally directed injection units 113 are supplied with cryogen from the lower region of the manifold. This arrangement achieves the effect described hereinbefore with respect to the refrigeration-generation system for the cabinet 61 depicted in FIGS. 4 and 5, namely the discharge of a larger percentage of $CO_2$ snow from horizontally oriented injectors 113.

The double-row, oppositely-facing arrangement of blowers and injectors creates a cyclonic movement of the atmosphere within the cabinet that is extremely effective in cooling product on multiple-tiered carts 109 of the type shown. Moreover, precise regulation of the cryogen injection rates by the modulating valve allows accurate control of temperature as low as about $-80°$ F. without the accumulation of snow on the cabinet floor.

Figure 11:
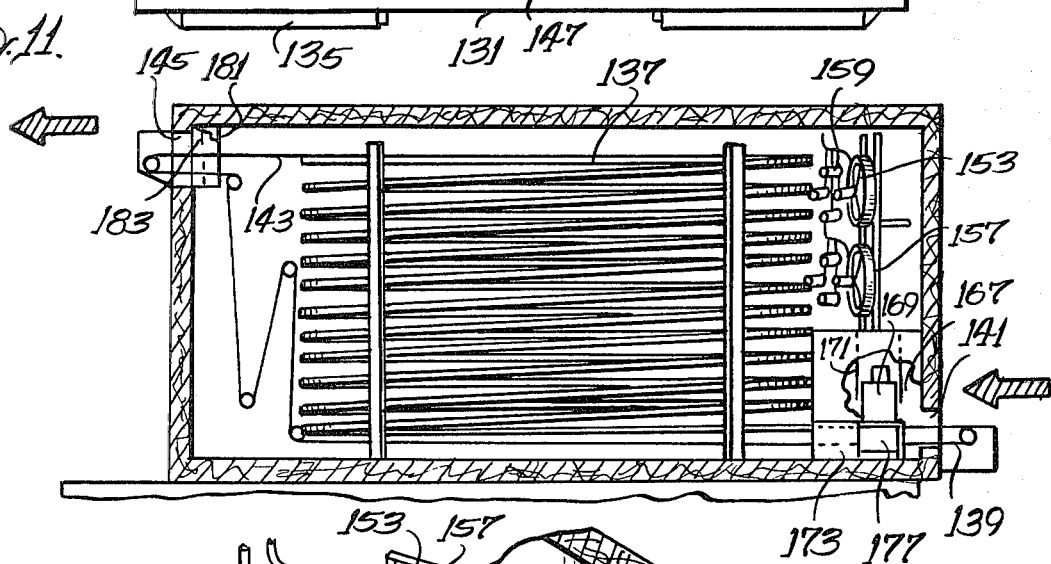
FIG. 11 is a vertical sectional view taken generally along the line 11—11 of FIG. 10.
Figure 12:
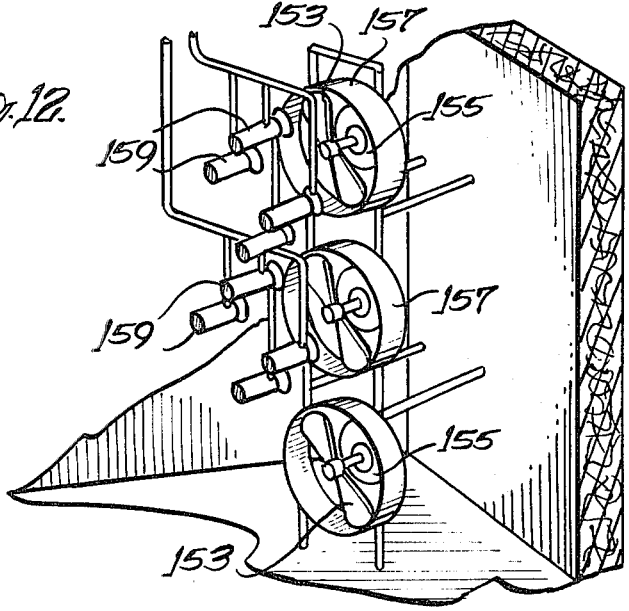
FIG. 12 is a fragmentary perspective view enlarged in size, illustrating one of the refrigeration-generation devices employed in several of the corners of the overall cabinet.

Illustrated in FIGS. 10 through 12 is a cabinet refrigeration device 130 which includes a large insulated cabinet 131 having four vertical insulated walls 133 for maintaining a low-temperature environment therewithin. Several doors 135 provide physical access to the interior of the cabinet wherein an endless conveyor 137 is located.

The conveyor 137 is of the type illustrated in U.S. Pat. No. 4,078,655, issued Mar. 14, 1978, the disclosure of which is incorporated herein by reference. The conveyor 137 includes an endless belt preferably made of stainless steel which is arranged to have a short straight entrance section 139 disposed near the bottom of the cabinet that preferably protrudes through a lower entrance opening 141 in the insulated wall of the cabinet and a short straight exit section 143 that similarly preferably extends just through an upper exit opening 145. In between the straight entrance and exit sections, the main section 147 of the endless belt is arranged to travel along a spiral or helical path about a central cage-type driving drum 149. Although the path is circular in plan view (FIG. 10), it might also be oval or the like, in which case a modified drive arrangement would be employed. A main motor 151 drives the drum through a gear arrangement and preferably also drives a sprocket drive which meshes with the belt near its exit location so as to suitably provide a low tension in the belt sufficient to frictionally engage the central drum 149 which provides the primary motive power for the conveyor, all as taught in the just-mentioned U.S. Patent.

Refrigeration generation equipment is disposed in three of the four corners within the cabinet, as best seen in FIG. 10, and could additionally be located in the center region by utilizing a suitably open drum. A primary circulation of the atmosphere within the cabinet is achieved by blowers or fans 153 which are arranged in vertical array. Each of the fans is powered by an individual electric motor 155 and is surrounded by a sleeve 157 that contributes to efficient flow and serves a protective function. Associated with most of the fans 153 are a plurality of cryogen injection units 159 of the type earlier described, each including the combination of a spring-loaded injection nozzle plus a surrounding inducer. As a result of the location of the injection units 159 just downstream from a fan 153, a supercharging effect is created with respect to vapor flow through the inducer, and an even more effective secondary circulation of vapor is created by the action of the injection units.

As best seen in FIG. 10, the fan arrays are directed at the helical section 147 of the endless conveyor and are oriented to discharge in a generally concurrent direction to the articles carried on it so that they are moving away from the fans and rising whereby the vapor currents tend to force the articles onto the belt, which has been found to surprisingly provide more efficient heat transfer than if the discharge is directed either directly radially inward toward the center or in countercurrent direction. The arrangement of the refrigeration units creates a swirling flow of cryogen vapor, and minute particles of $CO_2$ snow if carbon dioxide is used as the cryogen, which follows the helical path of movement within the cabinet. As best seen in FIG. 12, the lowermost fan 153, which is directing the vapor circulation past the lower strata of the conveyor helix containing the material, usually food, that has most recently entered the cabinet, need not necessarily be provided with associated cryogen injection units. Because the cold cryogen is more dense than the cryogen vapor that has been warmed by heat transfer with the material being carried on the conveyor, it has a tendency to gravitate towards the bottom of the cabinet, and thus efficient operation is achieved if the cryogen injection units 159 are located in the vertical central region and above. However, depending upon the particular product, it may be desired to provide a very cold environment at the entrance level.

A control system is provided which includes a control panel 161 for monitoring and controlling the overall operation and maintaining the desired temperatures throughout the cabinet. One or more temperature sensors 163 are provided within the cabinet to read the temperature and supply a signal to the control system. The overall control system preferably employs a modulating valve arrangement, such as that earlier described, so that the pressure of the liquid cryogen being fed to the spring-loaded nozzles can be varied to achieve precise temperature control without wasting cryogen.

The cold, more dense cryogen vapor gravitates to the bottom of the cabinet and has a tendency to flow out the lower entrance 141 through which the material being cooled is entering the cabinet on the straight conveyor section 139. The retard outflow of cryogen vapor at this location, a series of chambers 167 are provided just interior of the entrance to serve as a labyrinth-type seal, which reduces convection currents in the immediate region interior of the entrance. Its effect is increased by the provision of a blower 169 which is directed upwards and which takes suction from the entrance chamber system.

More specifically, a compartment is provided which surrounds and extends upward from the conveyor belt and which includes two depending baffles 171 which effectively separate it into three chambers 167. Located adjacent the entrance chamber is a small chamber 173 that serves as a plenum, and the blower 169 is supported atop the plenum and takes its suction therefrom. The blower 169 is powered by an electric motor and discharges vertically upward past its drive motor. There is an opening in the wall of the plenum between it and the entrance chamber, and an opening in the opposite wall of the plenum communicates with the main portion of the cabinet. The opening between the two chambers is partially closed by a slidable gate 175, and a similar slidable gate 177 is provided on the opposite wall to partially close that opening. Positioning of the slidable gates 175,177 effects adjustment of the intake of cold cryogen to the plenum 173 and permits the careful balancing of the suction so as to retard any substantial outflow of cold cryogen through the conveyor entrance 141 while preventing the ingress of humidity-bearing ambient air.

A generally similar but smaller chamber 181 having one or more depending baffles 183 is optionally provided just interior of the exit opening where the problem of cryogen outflow is less critical because of the higher density of the colder cryogen—particularly when carbon dioxide is being used as a cryogen. Especially when carbon dioxide is being employed as the cryogen, spill-over exhaust blowers (not shown), of a type well-known in the art, are preferably associated with side ducts 185 and 187 to remove the outflowing cold cryogen vapor from the vicinity of the cabinet and discharge it to the atmosphere exterior of the plant.

The spiral conveyor cabinet refrigeration device 130 is extremely efficient and can be used to freeze a wide variety of products because the speed of the conveyor can be varied within a fairly wide range so as to provide a cooling time of from less than ten minutes to well over one hour. The spring-loaded injection nozzles plus the inducers, in combination with the strategically located fans, provide excellent circulation of vapor along the entire length of the conveyor in the cabinet. The provision of multi-chamber vapor locks adjacent the entrance and the exit virtually eliminates air infiltration into the operating refrigeration cabinet and produces increased freezing rates while minimizing cryogen consumption.

Although the invention has been described with regard to certain preferred embodiments, it should be understood that various changes and modifications as would be obvious to one having the ordinary skill in this art may be made without departing from the scope of the invention which is defined in the appended claims. For example, automatically operated defrosters can be incorporated in association with the evaporators in the cabinets 11. Particular features of the invention are emphasized in the claims which follow.

What is claimed is:

1. A cabinet-type refrigeration device comprising cabinet means defining a first cooling region and a second adjacent region,
   refrigeration-generation equipment disposed within said second region which includes orifice means for expanding a liquid cryogen and means for supplying liquid cryogen to said orifice means,
   fan means mounted in said cabinet for creating a primary circulation of gas therewithin,
   inducer means having a substantially completely open flared entrance located in generally surrounding relationship to said orifice means so that the expanding liquid creates vapor and induces a secondary circulation of gas within said first region of the cabinet, said fan means being located so as to cause a flow of gas through said inducer means even when liquid is not being expanded,
   means for sensing the temperature within said cabinet,
   means for modulating the continuous flow of liquid cryogen through said orifice means in response to changes in the temperature sensed, and
   means for removing cryogen vapor from said cabinet.

2. A device in accordance with claim 1 wherein said orifice means-inducer means combination is located closely downstream from said fan means to supercharge said inducer means.

3. A device in accordance with claim 2 wherein baffle means is located adjacent the discharge from said fan means for directing the high pressure discharge into said first region, wherein the entrance to said inducer is located on the side of said baffle means toward said fan means and the exit from said inducer is located on the side of said baffle away from said fan means.

4. A device in accordance with claim 1 wherein said modulating means includes means for changing the area of said orifice.

5. A device in accordance with claim 4 wherein said orifice-area-changing means is operable in response to the liquid cryogen pressure at said orifice and wherein means is provided for varying said pressure in response to changes in the temperature sensed.

6. A device in accordance with claim 1 wherein said fan means is provided within said second region and wherein a plurality of orifice-inducer combinations are provided which direct cryogen vapor in different directions.

7. A device in accordance with claim 6 wherein said fan means includes a plurality of fans which discharge in a horizontal direction to create a cyclonic circulation in said first region about a vertical axis.

8. A device in accordance with claim 7 wherein another orifice-inducer, which is upwardly directed, is located closely downstream from said horizontal discharge from said fan means.

9. A device in accordance with claim 1 wherein additional fan means is provided within said second region at a location below said first-mentioned fan means which discharges in a substantially opposite direction and takes suction from a lower position of said first region.

10. A device in accordance with claim 8 wherein a manifold is provided within said cabinet for supplying liquid $CO_2$ to said orifice-inducers and wherein means is connected to an upper portion of said manifold for supplying vapor-rich liquid to said upwardly directed orifice-inducer and means is connected to a lower portion of said manifold for supplying vapor-poor liquid to the remainder of said orifice-inducers.

11. A device in accordance with claim 6 wherein means is provided defining a third region for cooling a load adjacent the opposite side of said second region and wherein a plurality of fan means discharges into said first region and takes suction from said third region and a plurality of additional fan means take suction from said first region and discharge into said third region, thereby creating a generally cyclonic flow pattern about a generally vertical axis.

12. A device in accordance with claim 11 wherein two of said orifice-inducers are located in the bottom portion of said second region so as to direct a stream of cryogen vapor upward so as to intersect with the discharge from each of said pluralities of fan means.

13. A device in accordance with claim 9 wherein evaporator means which is a part of a mechanical refrigeration system is disposed in said second region and wherein said temperature-sensing means is connected to control means for supplying refrigerant to said evaporation means when the temperature sensed is within a certain predetermined range.

14. A device in accordance with claim 1 wherein said cabinet means is formed with a lower entrance opening and an upper exit opening and wherein conveyor means which has a generally helical section is provided for transporting material being cooled through said cabinet means so that it gradually rises from said entrance to said exit.

15. A device in accordance with claim 14 wherein said cabinet means includes chamber means adjacent said entrance opening for substantially reducing the outflow of cryogen vapor from and the entry of ambient air into said cabinet means at said lower entrance opening.

16. A device in accordance with claim 14 wherein blower means is provided for circulating cryogen vapor upward in said cabinet means, and means is provided for connecting the suction side of said blower means to said entrance chamber means.

17. A device in accordance with claim 14 wherein said fan means discharge generally horizontally and in a direction generally concurrent with the direction of movement of material along said helical section of said conveyor means.

18. A cabinet-type refrigeration device comprising
cabinet means defining a first cooling region and a second adjacent region, said first region being partially defined by a pair of parallel vertical walls which extend from the boundary with said second region,
a plurality of fan means mounted to discharge gas horizontally which are located at different vertical levels within said cabinet means,
refrigeration-generation equipment disposed within said second region which includes
orifice means for expanding liquid cryogen and inducer means having a substantially completely open flared entrance located in generally surrounding relationship to said orifice means so that the expanding liquid creates cryogen vapor and induces a secondary circulation of gas within the cabinet,
said fan means and said orifice-inducer means being arranged to discharge vapor along one of said parallel walls and to take suction from along the other of said walls and also so there is a flow of vapor through said inducer means even when cryogen is not being expanded, and
means for removing cryogen vapor from said cabinet, whereby vapor streams move within said first region in substantially horizontal directions having the general pattern of a cyclone revolving about a vertical axis.

19. A refrigeration device which comprises
cabinet means defining an enclosure wherein cooling of product takes place and having a lower entrance opening and an upper exit opening,
chamber means adjacent said lower entrance opening for substantially reducing the outflow of cryogen vapor and the entry of ambient air into said cabinet means,
conveyor means defining a generally helical path for transporting material to be cooled through said cabinet means so that the material gradually rises from said lower entrance opening to said upper exit opening,
a plurality of orifice means mounted in said cabinet means for expanding liquid cryogen,
means for supplying liquid cryogen to said orifice means,
a plurality of inducer means each having a substantially open flared entrance and being located in generally surrounding relationship to one of said orifice means,
a plurality of fan means mounted within said cabinet for creating circulation of gas therewithin, said orifice means and said associated inducer means being located in the discharge path of one of said fan means so as to cause a flow of gas through said inducer means even when liquid cryogen is not being expanded,
whereby the expansion of liquid cryogen creates cryogen vapor and induces additional circulation of gas,
means for sensing the temperature within said cabinet means, means for modulating the continuous flow of liquid cryogen through said orifice means in response to changes in the temperature sensed, and
means for removing cryogen vapor from said cabinet means.

20. A device in accordance with claim 19 wherein blower means is provided for circulating cryogen vapor upward in said cabinet means, and means is provided for connecting the suction side of said blower means to said entrance chamber means.

21. A device in accordance with claim 19 wherein said fan means discharge generally horizontally and in a direction generally concurrent with the direction of movement of material along said helical path section of said conveyor means.

* * * * *